US011201756B2

(12) United States Patent
Reinelt et al.

(10) Patent No.: US 11,201,756 B2
(45) Date of Patent: Dec. 14, 2021

(54) BUILDING AUTOMATION SYSTEM

(71) Applicants: Jens Reinelt, Bochum (DE); Carsten Stöcker, Hilden (DE); Jürgen Waffner, Essen (DE)

(72) Inventors: Jens Reinelt, Bochum (DE); Carsten Stöcker, Hilden (DE); Jürgen Waffner, Essen (DE)

(73) Assignee: innogy Innovation GmbH, Essen (DE)

( * ) Notice: Subject to any disclaimer, the term of this patent is extended or adjusted under 35 U.S.C. 154(b) by 0 days.

(21) Appl. No.: 16/271,548

(22) Filed: Feb. 8, 2019

(65) Prior Publication Data

US 2019/0190742 A1 Jun. 20, 2019

Related U.S. Application Data

(63) Continuation of application No. PCT/EP2016/068950, filed on Aug. 9, 2016.

(51) Int. Cl.
*G05B 15/02* (2006.01)
*H04L 12/28* (2006.01)
*H04L 12/12* (2006.01)

(52) U.S. Cl.
CPC .......... *H04L 12/2816* (2013.01); *G05B 15/02* (2013.01); *H04L 12/12* (2013.01); *H04L 12/2807* (2013.01); *G05B 2219/2613* (2013.01)

(58) Field of Classification Search
CPC . H04L 12/2816; H04L 12/12; H04L 12/2807; G05B 15/02; G05B 2219/2613
See application file for complete search history.

(56) References Cited

U.S. PATENT DOCUMENTS 6,408,228 B1* 6/2002 Seem ................. F24F 11/30
700/276
2002/0147810 A1* 10/2002 Traversat ............. G06Q 30/02
709/224

(Continued)

OTHER PUBLICATIONS

R. Dennis and G. Owen, "Rep on the block: A next generation reputation system based on the blockchain," 2015 10th International Conference for Internet Technology and Secured Transactions (ICITST), London, UK, 2015, pp. 131-138 (Year: 2015).*

(Continued)

*Primary Examiner* — Christopher E. Everett
(74) *Attorney, Agent, or Firm* — Reinhart Boerner Van Deuren P.C.

(57) ABSTRACT

Disclosed herein are embodiments of a building automation system. The building automation system includes at least one first appliance device having an actor and/or a sensor. The first appliance device includes a first function module and is configured to operate in accordance with the first function module in order to provide a first function. The building automation system also includes a peer-to-peer network with a peer-to-peer application and a peer-to-peer module assigned to the first appliance device and configured to communicate with the peer-to-peer application. The peer-to-peer application includes a controlling means configured to provide a second function module to the first appliance device by means of the peer-to-peer module assigned to the first appliance device, and the first appliance device is configured to operate in accordance with the second function module in order to provide at least one second function.

18 Claims, 6 Drawing Sheets

(56) References Cited

U.S. PATENT DOCUMENTS

| | | | |
|---|---|---|---|
| 2003/0040813 A1 | 2/2003 | Gonzales et al. | |
| 2004/0039706 A1* | 2/2004 | Skowron | G06Q 10/10 705/51 |
| 2007/0105542 A1* | 5/2007 | Friedman | H04L 67/34 455/420 |
| 2010/0082176 A1* | 4/2010 | Chang | H02J 3/14 700/295 |
| 2011/0231533 A1* | 9/2011 | Ewing | G01D 21/00 709/221 |
| 2011/0296189 A1* | 12/2011 | Sakumoto | H04L 9/3093 713/176 |
| 2013/0031211 A1* | 1/2013 | Johnson | H04N 21/23103 709/218 |
| 2015/0120965 A1* | 4/2015 | Huang | G06F 13/107 710/8 |
| 2016/0057046 A1* | 2/2016 | Slupik | H04L 45/74 370/329 |
| 2016/0128043 A1* | 5/2016 | Shuman | H04W 72/044 370/331 |
| 2016/0217436 A1 | 7/2016 | Brama | |
| 2018/0046164 A1* | 2/2018 | Drees | G06F 3/048 |
| 2019/0050541 A1* | 2/2019 | Wright | G06Q 20/3829 |

OTHER PUBLICATIONS

Qiang Wang et al., Reprogramming Wireless Sensor Networks: Challenges and Approaches, IEEE Network, May/Jun. 2006, pp. 48-55 (Year: 2006).*

Sam Michiels et al., "DAViM: a Dynamically Adaptable Virtual Machine for Sensor Networks," MidSens'06, Nov. 27-Dec. 1, 2006, pp. 7-12 (Year: 2006).*

* cited by examiner

BUILDING AUTOMATION SYSTEM

CROSS-REFERENCE TO RELATED PATENT APPLICATION

This patent application is a continuation of PCT/EP2016/068950, filed Aug. 9, 2016, the entire teachings and disclosure of which are incorporated herein by reference thereto.

FIELD

The invention relates to a building automation system comprising at least one first appliance device comprising at least one actor and/or at least one sensor, wherein the first appliance device comprises at least one first function module, wherein the first appliance device is configured to operate in accordance with the first function module in order to provide at least one first function. The invention also relates to a method for operating a building automation system, an appliance device and a peer-to-peer application.

BACKGROUND

Communication systems with one or more sensor(s) and/or one or more actor(s) are known from prior art. An example of such a communication system is a building automation system. A building automation system according to prior art is a centralized control of one or more building appliance(s).

A typical prior art building automation system 100 is depicted in FIG. 1. The building automation system 100 comprises a plurality of building appliances 104.1, 104.2, 104.3, 104.4, a building controller 106 and home controller 106, respectively, and a central server 108 (backend 108). The home controller 106 is arranged within a building 102 and is configured to control the plurality of building appliances 104.1, 104.2, 104.3, 104.4. The home controller 106 is connected via a communication unit 125 with the central server 108 via a standard network 110, such as the Internet, and is controlled by the central server 108. In particular, the central server 108 manages user data of the user of the building automation system 100, conducts optimization processes for the building automation system 100 and provides information and instruction messages to the home controller 106. For instance, a user can control one or more appliance devices 104.1, 104.2, 104.3, 104.4 via a mobile terminal (e.g. smartphone) of the user by transmitting instruction message(s) to the home controller 106 via the backend server 108.

Furthermore, some appliance devices comprising one or more actor(s) can be automatically operated. By way of example, a light appliance device 104.1 is arranged. The light appliance device 104.1 comprises at least one actor 118.1 e.g. configured to at least activate and deactivate the light appliance device 104.1. The actor 118.1 can be integrated in the light appliance device 104.1, as depicted, or it can be connected with the light appliance device (e.g. a switch can be integrated in a feed line of the light appliance device).

The actor 118.1 can be driven by the home controller 106. For instance, an instruction message can be transmitted via a wireless communication network 112 from a communication unit 114 of the home controller 106 to a communication unit 114 of the light appliance device 104.1. The instruction data set with one or more instruction(s) of said instruction message is processed in accordance with the first function module 122.1 of the light appliance device 104.1. As a result of the processing, the actor 118.1 may cause e.g. an activation or deactivation of the light appliance device 104.1 e.g. by closing or opening a current circuit.

The home controller 106 may transmit said instruction message based on a sensor data set received from a further appliance device 104.2, such as a motion detector 104.2 comprising a motion sensor 120.1. The motion detector 104.2 with its motion sensor 120.1 operates in accordance with a further first function module 122.2. For instance, the first function module may define that a message comprising a sensor data set with one or more sensor related values (e.g. measured value(s) or values determined based on measured value(s)) is transmitted to the home controller 106 by the communication module 114 if e.g. a parameter value detected by the sensor 120.1 increases a predefined threshold value. The home controller 106 may process the received message comprising a sensor parameter data set by a processing unit 123 and may, as previously described, transmit an instruction message, as a result of the processing of the sensor data set.

In a similar way, a heating appliance device 104.3 and a temperature measuring device 104.4 can be controlled by the home controller 106. The temperature measuring device 104.4 comprises a temperature sensor 120.2, a communication unit 114 and a first function module 122.4. The temperature measuring device 104.4 and its temperature sensor 120.2 is operated in accordance with the first function module 120.2. For instance, temperature values are measured and forwarded to the home controller 106 in accordance with the first function module 120.2. The home controller 106 may evaluate the received temperature values and may create an instruction message.

The heating appliance device 104.3 comprises a communication unit 114, an actor 118.2 at least configured to activate and deactivate the heating appliance device 104.3 (e.g. opening and closing a valve) and a first function module 122.3. For instance, the above instruction message is transmitted from the home controller 106 to the heating appliance device 104.3. Then, the actor 118.2 activates or deactivates the heating appliance device 104.3 in accordance with the instruction message and the first function module 122.3.

Generally, a function module may be a software and/or hardware module (e.g. a state machine) which is implemented in an appliance device. It may comprise rule(s)/algorithm(s) to be processed. For instance, at least one instruction (parameter) and/or measured value can be processed in accordance with the function module in order to provide a first function through the respective appliance device (e.g. providing/transmitting motion sensor data in order to operate a light appliance device). Usually, an appliance device is configured for one or more specific first function(s) during the manufacturing process of said appliance device. Indeed, it may be possible to update a first function module (e.g. resetting threshold values) via the server 108 and the home controller 106. However, this process must be initiated by the user of the building automation system or the server 108. Further, according to prior art it is generally not possible to implement a further function into an appliance device after the manufacturing process.

A further disadvantage of such building automation systems is the server-client structure of these systems. Usually, as described above, a central server is used for controlling two or more different home controllers assigned to respective building entities. The home controller may act as a client with regard to the central server and may act as a server with regard to the plurality of appliance devices of a building entity.

A disadvantage of server-client structures of this kind, particularly the server (or platform), apart from the high transaction costs, is that the central instance or central server manages confidential data, such as user data including e.g. access data for accessing the appliance devices. A persistent problem affecting the central instance is that of protecting the confidential data stored on one or more server(s) from access by unauthorized third parties. In particular, a high degree of security expenditure is required, in order to prevent said data from being tampered with. This in turn leads to higher transaction costs. A further disadvantage is the complex and costly infrastructure for providing the described server-client structure. Furthermore, it is not possible to update a first function module a simple and secure manner.

Therefore, the object of the present invention is to provide a building automation system comprising at least one appliance device providing at least one first function, wherein the function can be changed in a secure and simple manner.

BRIEF SUMMARY

The above object is solved according to a first aspect of the invention by a building automation system according to the present disclosure. The building automation system comprises at least one first appliance device comprising at least one actor and/or at least one sensor. The first appliance device comprises at least one first function module. The first appliance device (e.g. at least the actor and/or sensor) is configured to operate in accordance with the first function module in order to provide at least one first function. The building automation system comprises at least one peer-to-peer network comprising at least one peer-to-peer application. The building automation system comprises at least one peer-to-peer module assigned to the first appliance device and configured to communicate with the peer-to-peer application. The peer-to-peer application comprises at least one controlling means configured to provide at least one second function module to the first appliance device by means of the peer-to-peer module assigned to the first appliance device. The first appliance device (e.g. at least the actor and/or sensor) is configured to operate in accordance with the second function module in order to provide at least one second function.

In contrast to prior art building automation systems, a (subsequent) function change of one or more appliance device(s) is enabled by providing a peer-to-peer application comprising a controlling means configured to provide at least one second function module to the one or more appliance device(s). In other words, a building automation system can be managed and controlled without a central instance but by a peer-to-peer application of a peer-to-peer network. Thereby, a peer-to-peer module assigned to the first appliance device is capable of at least receiving a second function module from the peer-to-peer application and peer-to-peer network, respectively. By the fact that instead of a central server or a platform, a peer-to-peer network (also called a framework) undertakes the in particular tamper-proof controlling of the building automation system, in particular, the provision of one or more second function module(s) for providing one or more second function(s), by means of a peer-to-peer application, high security standards are achieved in that all computers (peer nodes or simply nodes) in the peer-to-peer network, at least a part of the peer computers in the peer-to-peer network, monitor(s) at least the correct provision of said second function module(s) to the appliance device by means of the peer-to-peer application. The transaction costs can be significantly reduced. No central, superior platform, server, cloud, etc. is required. The complexity of managing and controlling a building automation system can be significantly reduced. User data can be securely managed.

The building automation system may comprise one or more appliance device(s). An appliance device may comprise at least one sensor for measuring at least one parameter value and/or at least one actor configured at least to change a state of the appliance device. "Comprising" means hereby that the actor and/or sensor may be integrated in the appliance device and/or connected with the appliance device e.g. via a line, cable, or the like.

The appliance device with its at least one sensor and/or actor is operated in accordance with a first function module for providing at least one first function. A function module may be a software and/or hardware module (e.g. a state machine) which is implemented in an appliance device. A function module according to the invention may comprise rule(s)/algorithm(s) to be processed. For instance, at least one instruction (parameter) and/or measured value can be processed in accordance with the function module in order to provide a specific function through the respective appliance device (e.g. providing/transmitting motion sensor data in order to operate an actor of appliance device). The first function module may be implemented during the manufacturing process of the appliance device.

Further, an appliance device may be assigned to a building entity, such as a building, building complex, apartment, flat, factory hall, property, etc. For instance, the appliance device can be installed within a building or outside a building or on specific premises. Non-exhaustive examples of appliance devices are light appliance devices, motion detectors, security appliance devices, fence control system, heating, ventilation and/or air conditioning appliance devices, timing circuit devices, shading appliance devices (e.g. shutters), access control devices, gates, heat meters, water meters, gas meters and electricity meters, household appliance devices (e.g. refrigerator, coffee machine, stove, etc.), television appliance devices, recorder, user terminals (e.g. smart phones, tablet computers, etc.), (mobile) robots, (mobile) transport devices, storage and/or warehouse devices, work tools, control rooms, etc.

The building automation system comprises at least one peer-to-peer module. The peer-to-peer module is assigned to the at least one appliance device. Preferably, each peer-to-peer module is uniquely assigned to a respective appliance device. For instance, each appliance device can comprise a peer-to-peer module. Preferably, the peer-to peer module is integrated in the appliance device.

It is also possible that a communication connection is provided between the appliance device and the peer-to-peer module assigned to said appliance device. This means that the peer-to-peer module can at least communicate and/or act on behalf of the appliance device. For example, the peer-to-peer module can be partly formed by a separate processing device, such as mobile communication device (e.g. mobile phone, mobile computer, etc.), or it can run on a remote stationary processing device (e.g. in a data center). In case of a mobile communication device or a remote processing device the at least one appliance device may have a secure communication channel to the processing device (or mobile communication device) of the data center and the processing device itself may have a connection to the peer-to-peer network. In an embodiment the remote processing device may be a gateway to the peer-to-peer network. This means that the appliance device can securely communicate via its peer-to-peer module and the gateway to the peer-to-peer network.

In comparison to a client server building automation system in which a server provides a service and a client uses the service, these roles are cancelled in the present peer-to-peer network. Each participant (e.g. node) of the peer-to-peer network can use a service and the like and offer such a service. In particular, a peer-to-peer network is self-determined and/or self-organized (without any higher-level units). In the present case preferably each node and computer, respectively, of the peer-to-peer network comprises the peer-to-peer application. The peer-to-peer module is configured to communicate, e.g. send/receive messages to/from the peer-to-peer application. The peer-to-peer module may be a peer and node, respectively, of the peer-to-peer network.

The peer-to-peer module is, in particular, configured to communicate with the peer-to-peer application of the peer-to-peer network. By communicating with the peer-to-peer application the peer-to-peer module and the respective appliance device may be controllable by the peer-to-peer application (and thus, preferably, by all participants of the peer-to-peer network). In particular, at least the provision of a second function module to the at least one appliance device for providing at least one second function is controllable by the peer-to-peer application. In particular, the peer-to-peer application comprises at least one controlling means. The controlling means may be preferably formed by a control smart contract comprising computer code which can be capable of at least controlling the provision of the at least one second function module to the at least one appliance device.

More particularly, the peer-to-peer application is configured to manage the provision of at least one second function module to an appliance device in order to provide at least one second function by the appliance device. For instance, the first function module of the appliance device can be substituted by the second function module, the first function module of the appliance device can be modified such that it becomes a second function module or the appliance device may comprise at least one first function module and at least one second function module.

The list of all (anonymised or pseudoanonymised) participants or entities of the at least one peer-to-peer network can preferably be made known to each participant, so in particular to each entity of the building automation system, as a peer-to-peer identifier, e.g. in the form of a communications address. A mixer logic (i.e. mixing of identifications and using random identifications for a specific appliance device or user for its individual transactions) can be used to disguise user identifications of individual transactions to avoid analysis of movement profiles.

A peer-to-peer module can be at least partially formed by a software module and/or at least partially formed by a hardware module.

According to a first embodiment of the building automation system of the present invention, the first appliance device may comprise a rewritable storage unit configured to store at least one of the first function module and the second function module. The rewritable storage unit may be connected with the peer-to-peer module assigned to the first appliance device. A second function module provided by the peer-to-peer application, in particular, the controlling means, may be forwarded to the rewritable storage unit by the peer-to-peer module in order to store the second function module. It may be possible that the second function module is stored in addition to the first function module or the first function module is overwritten by the second function module. Preferably, a secure memory in form of a protected software container or in form of a hardware enclave or trusted execution environment can be provided. A function module may be stored such that the appliance device, in particular, the at least one actor and/or the at least one sensor, can be operated in accordance with the (second) function module.

Preferably, in order to change a function, in particular, to substitute a first function by a second function (e.g. from a first function to a second function) of an appliance device or to provide said appliance device with at least one additional (second) function, a state machine of the (first) appliance device can be changed and a further state machine can be provided, respectively. According to one embodiment, the first function module may be a first state machine. The second function module may be a second state machine. The first state machine may differ from the second state machine. The change of a function (e.g. the substitution or the provision of a further (second) function) can be used to substitute or extend the task(s) of an appliance device and/or to substitute or extend the application area. The change(s) to be made can be demand-driven.

According to a preferred embodiment, the controlling means may be configured to cause the provision of a (new) second function module in order to implement a new (second) function in one or more appliance device(s) during the ongoing operation of the building automation system. In particular, it is not necessary to manually modify one or more of the appliance devices and/or to interrupt the operation of the building automation system.

As previously described, a building automation system may comprise a plurality of appliance devices. According to an embodiment, the building automation system may comprise at least one further appliance device. The first appliance device may be configured to directly communicate with the further appliance device. Alternatively or additionally the first appliance device may be configured to communicate with the further appliance device by means of the peer-to-peer application. In particular, a home controller and/or server can be omitted. Appliance devices of a building automation system can directly communicate with each other and/or by means of the peer-to-peer application and peer-to-peer network, respectively.

For instance, direct communication between at least two appliance devices, in particular, between the peer-to-peer module assigned to a first appliance device and a further peer-to-peer module assigned to a further appliance device includes the exchange of information by a peer-to-peer messaging system. This means a peer-to-peer module can send a message to another peer-to-peer module to submit an information or to trigger an action. Messages can be clear text, signed, hashed, time-stamped and/or encrypted.

Alternatively or additionally, communication between at least two appliance devices, in particular, between the peer-to-peer module assigned to a first appliance device and a further peer-to-peer module assigned to a further appliance device may include the transmission of information from a peer-to-peer module to the peer-to-peer application, which is configured to forward the information to the further peer-to-peer module. For instance, information (messages) can be provided with identifiers, address information or the like in order to ensure the transmission to the desired recipient. Transmitting of information/messages may include the writing of information into the peer-to-peer application which is inspectable by at least part of the participants of the peer-to-peer network. Forwarding of information may include the reading of information stored in the peer-to-peer application at least by the receiving peer-to-peer module.

It is noted that one or more physical standard (wired and/or wireless) communication networks can be used for communication. It shall be understood that an appliance device and its peer-to-peer module, respectively, can be formed as a node of the peer-to-peer network, and thus, the appliance device and its peer-to-peer module, respectively, is a part of the peer-to-peer network including at least a part of the peer-to-peer application.

According to a particular preferred embodiment, the first appliance device may be configured to communicate with the further appliance device by transmitting at least one message to the further appliance device (e.g. directly or via the peer-to-peer application). The transmitted message may be provided with a signature of (and by) the peer-to-peer module assigned to the first appliance device. Alternatively or additionally, the first appliance device may be configured to communicate with the further appliance device by receiving at least one message from the further appliance device (directly or via the peer-to-peer application). The received message may be provided with a signature of (and by) the peer-to-peer module assigned to the further appliance device. In particular, each message/information transmitted between two appliance devices and/or other devices/entities of the building automation system can be provided with a unique signature of the respective peer-to-peer module. The signature may be uniquely assigned to the respective entity (e.g. appliance device) A message may comprise e.g. sensor data set(s) and/or instructions data set(s) and/or second function module(s). The provision of a message with a signature enables to verify/validate the sender of said message. Security can be increased without the need of a central instance.

Preferably, at least a part of the nodes of the peer-to-peer network may be configured to validate at least one received message based on the provided signature prior to further processing the message. The peer-to-peer network may comprise at least one validating node, preferably, a plurality of validating nodes. Only in the case the at least one validating node comes to a positive validation result, the message is further processed by the recipient. For instance, the message may be an instruction message and control message, respectively, sent by one appliance device to another appliance device. The instructions will only be used e.g. for driving one or more actor(s) in case of a positive validation result. Preferably, a plurality of nodes conducts the validation process. Only in the case all of these validation nodes come to a positive validation result, the message may be further processed (e.g. stored, analyzed, read out, etc.). Thereby, the security can be further increased.

The validation process may comprise a comparison of the signature provided with the received message and valid signatures preferably stored in the peer-to-peer application or a storage arrangement controlled by the peer-to-peer application. For instance, a list of valid signatures can be stored in the peer-to-peer application. A positive validation result is provided if the signature provided with the received message corresponds to a valid signature. Preferably, such a validation process can be conducted by two or more nodes in parallel.

Furthermore, a building automation system may comprise at least two sub-building automation systems, wherein the respective appliance devices of the at least two sub-building automation systems can communicate by means of the respective peer-to-peer modules with the (same) peer-to-peer network. The appliance devices of a first sub-building automation system may be assigned to a first building entity and the appliance devices of the at least one further sub-building automation system may be assigned to a further building entity. It shall be understood that an appliance device may be comprised by two or more sub-building automation systems.

According to a further embodiment, the first appliance device may be assigned to a first sub-building automation system assigned to a first building entity. The further appliance device may be assigned to a further sub-building automation system assigned to a further building entity. In other words, appliance devices of at least two different sub-building automation systems can communicate with each other without using a home controller and/or a server, such as a backend system.

The change of a function of one or more appliance devices can be initiated e.g. by a user of the (sub-)building automation system or another entity/user. Preferably, the building automation system may comprise at least one request entity. The building automation system may comprise at least one peer-to-peer module assigned to the request entity. The peer-to-peer module assigned to the request entity may be configured to transmit a (function) request message to the peer-to-peer application, preferably, in order to provide the establishment of a second function. The request entity may be an appliance device or another computing device comprising a peer-to-peer module.

Furthermore, according to a further embodiment, the appliance device may be a mobile unit at least temporarily assigned to a building entity and/or building automation system. Examples of mobile units are cars, autonomous vehicles, drones, boats, planes, robots, working tools e.g. brought by mobile units or the like. A mobile unit can be temporarily assigned to a building entity, e.g. for a particular time period and/or for a particular task, or permanently. A mobile unit (appliance) device may be configured, for example, to provide one or more service(s) (according) to a first and second function modules, such as transportation services, inbound or outbound logistic services, installation services, maintenance services, quality assurance and/audit services, security services or emergency service for an entity or process that uses at least parts of a building entity or devices located in a part of a building.

Temporarily assignments can be given to a mobile unit that e.g. provides a particular service to, at or within a building entity. A mobile unit can be registered, pre-qualified and/or (temporarily) integrated into the building automation system based on pre-defined rules (e.g. start time, end time, access rights to selected restricted areas or conditions for leaving the building or emergency access rules or security interventions). In a simple example a mobile transport unit may pick up a finished product from a 3D printer for delivery to a customer. Based on a production and/or transport transaction agreement the mobile unit may be registered, pre-qualified and/or get access to a specific machine to pick-up a specific product. When the product is picked-up the mobile unit may lock the product into a container. This (secure) locking process might be a precondition for the building automation system to open or close gate(s) for the mobile unit to leave (or enter) the building or the surrounding premises.

In a further example working tools may be enabled or disabled based on pre-defined rule(s). Their usage may be restricted by and/or logged in the peer-to-peer application.

Proper usage might be controlled by the peer-to-peer application for safety, security or quality reasons.

The peer-to-peer application may be integrated in a ERP, MES, Facility Management, Planning and/or Documentation system(s) that provides rules for access, safety, security or quality requirements. Integration of such a system may be done by connecting them via a peer-to-peer module to the peer-to-peer network and/or by registering them in the peer-to-peer application. Compliance of rule(s) can be checked via analysis of log data in the peer-to-peer application. Access management to the log data may be done for a registering means of the peer-to-peer application.

In another example, after an emergency alarm, emergency response team(s), law enforcement team(s) and/or military team(s) may get access to one or building entity(ies), e.g. the premises or building(s). The building automation system may guide such a team to specific location(s). Emergency access rule(s) can be pre-defined and qualified and/or tested during regular emergency drills. The proper set-up of the rules can be validated by authorities via inspection of the peer-to-peer application.

In a further embodiment, registration messages, sensor and/or actor data, control mean events, alarms, transaction messages and/or communication messages among devices (including mobile units) of the building automation system may be protocolled in the peer-to-peer application for logging and/or auditing purposes.

According to a further preferred embodiment of the building automation system according to the present invention, the peer-to-peer application may be configured to generate a function transaction agreement at least about the provision of the second function module to the first appliance device preferably between the first appliance device and the request entity (e.g. a further appliance device or another entity). The peer-to-peer application may be configured to store the generated function transaction agreement. A function transaction agreement may comprise details about the second function module to be provided to at least one further appliance device.

The generation of the function transaction agreement can be caused or initiated by at least one peer-to-peer module, such as the peer-to-peer module assigned to the request entity (e.g. a further appliance device or another entity), for example by transmitting a request message comprising at least one instruction on the generation of the function transaction agreement. The request message may be sent by the request entity in order to at least temporarily cause the change of a function of at least one appliance device.

In particular, a suitable code and, where necessary, at least one key (e.g. signature) for verifying the sender of a message sending request entity and/or the authenticity of a message can be transmitted to the peer-to-peer application or written in the peer-to-peer application by a peer-to-peer module. The function transaction agreement may be generated between two entities (e.g. two appliance devices). Preferably following a confirmation message from the other entity (e.g. the first appliance device) comprising a suitable instruction and, where necessary, at least one key (e.g. signature) for verifying the sender of the confirmation message, a corresponding function transaction agreement can be advantageously generated following a check by the peer-to-peer network of the peer-to-peer application. Expressed in simple terms, each entity (e.g. appliance device) can search for one or a plurality of suitable partners by means of the peer-to-peer network or the peer-to-peer application and a function transaction agreement can be generated by means of the peer-to-peer application.

According to a preferred embodiment, the generated function transaction agreement may comprise at least one of:
 function transaction criterion,
 second function module or identifier of the second function module,
 identifier assigned to the first appliance device and/or peer-to-peer module assigned to the first appliance device,
 identifier assigned to the request entity and/or peer-to-peer module assigned to the request entity.

The generated function transaction agreement may comprise one or more second function module(s) and or an identifier of the second function module which can be used to access the second function module. E.g. the controlling means can access a storage arrangement controlled by the peer-to-peer application and can select the second function module to be provided based on the identifier of the second function module. Further security information, such as keys needed to access the storage arrangement and/or the specific second function module, can be stored in the function transaction agreement in order to increase the security.

Further, identifiers of all involved entities, such as the at least one (first) appliance device and the at least one request entity can be stored. The identifier may be a unique (peer-to-peer) identifier assigned to the request entity, i.e. the entity which requests the change of a function of an appliance device. For instance, the identifier may be a serial number, a communications address, a unique code, signature, name or other identifier of a user of the request entity, or the like. Furthermore, an (unique) identifier assigned to the involved appliance device can be stored in the agreement. Also this (peer-to-peer) identifier may be serial number, a communications address, a unique code, signature or the like. By storing these details, the peer-to-peer application can control the provision of a specified function module to one or more specific appliance devices.

Alternatively or preferably additionally, at least one function transaction criterion may be stored in the function transaction agreement. The function transaction criterion may be a financial value to be transferred from an account of e.g. a request entity to an account of the provider of an appliance device for allowing implementation of the second function module.

The function transaction agreement may comprise further details, such as time data (installation date, de-installation date), or the like.

Further transaction agreement(s) can be generated as stand-alone transaction agreement(s) or sub-function transaction agreement(s). For instance, updating transaction agreements, communication transaction agreements and the like can be generated and stored by the peer-to-peer application. An updating transaction agreement can be generated in order to define rules for updating a function module of an appliance device. For instance, an updating transaction agreement can enable one or more appliance devices to automatically conduct an updating process. Preferably, the peer-to-peer module assigned to the first appliance device may be configured to conduct an updating process by accessing an update module provided by the peer-to-peer application (based on an updating transaction agreement). The updating process is conducted without using a home controller or server.

Furthermore, in a communication transaction agreement, two or more appliance devices can define communication rule(s) for communicating with each other. Preferably, the first appliance device (by means of its peer-to-peer module) and the further appliance device (by means of its peer-topeer module) can communicate with each other based on a generated and stored communication transaction agreement. In particular, the communication between said devices can be controlled by at least a part of the nodes of the peer-to-peer network based on the at least one stored communication transaction agreement.

According to a further embodiment, the controlling means may be configured to provide at least one second function module to the first appliance device in accordance with the function transaction agreement. At least part of the nodes may check—based on the stored function transaction agreement—whether the at least one second function module is correctly provided by the controlling means. E.g. it can be checked whether the correct function module is provided to the correct appliance device(s) at a correct time. A manipulation of such a process can be prevented.

What is more, according to a preferred embodiment, the peer-to-peer application may comprise at least one registration means configured to receive a registering message of a first peer-to-peer module assigned to the (first) appliance device and/or to receive a registering message of a peer-to-peer module assigned to the request entity. The registration means may be configured to register the (first) appliance device by storing a unique (peer-to-peer) identifier of the (first) appliance device and/or to register the request entity by storing a unique (peer-to-peer) identifier of the request entity. For instance, in order to communicate with other appliance device(s) of the building automation system, an appliance must be registered in the peer-to-peer application.

An entity, device, (mobile) unit or the like can be registered in the peer-to-peer application, as e.g. a so called smart asset. Each registered entity or device can be stored with its unique (peer-to-peer identifier) e.g. in one or more identifier list(s) of authorized appliance device and/or request entity. In particular, the respective signatures of the registered appliance device and/or request entity can be stored in the list. Then, the validation node(s) can conduct the validation process, as previously described.

According to an embodiment of the building automation system according to the present invention, at least one peer-to-peer module may be configured to cause a registration of the entity and device, respectively, (or the corresponding peer-to-peer module) in the peer-to-peer application (or network) by transmitting a registering message comprising at least an identifier assigned to the entity (device) and/or peer-to-peer module. The identifier might be already a peer-to-peer identifier or another identifier suitable to uniquely identify the entity. The (unique peer-to-peer) identifier may be a serial number or a smart asset hash of e.g. the entity, the user's name of the entity, a communication address of an appliance device, a signature, etc. If e.g. the identifier is not already a unique peer-to-peer identifier, e.g. if the identifier is a name of an appliance device, the peer-to-peer application, in particular, the registering means, may be configured to generate a unique peer-to-peer identifier for the respective entity (according to preset rule(s)). In particular, the registering means of the peer-to-peer application may register the respective entities by storing at least the peer-to-peer identifier and/or signature (the signature may be the identifier) in the peer-to-peer application and/or a storage arrangement controlled by the peer-to-peer application.

It shall be understood that an entity can be a user registered in the peer-to-peer application. Each registered user can be stored with or linked to its unique (peer-to-peer identifier) e.g. in one or more identifier list(s) of authorized entities. According to an embodiment of the building automation system according to the present invention, a user may authenticate himself at one of the appliance devices in a building automation system.

Prior to the registration of an appliance device, request entity or the like, at least part of the nodes (peers) of the peer-to-peer network may check whether the registering requirements (such as specific entity/device specifications or valid signatures or compliance requirements) predefined by the peer-to-peer network are met by the entity/device requesting registration. For instance, it may be necessary that an appliance device meets predefined technical specifications. In order to perform the check, preferably, further data may be included in the registering message. In particular, the peers/nodes of the peer-to-peer network may provide registering rules or registering requirements which must be fulfilled by an entity, appliance device or the like to be regarded as a trustful entity. Rules/requirements may be individually defined by the peers of a peer-to-peer network. E.g. it may be necessary that a new entity must be recommended by an entity which is already a participant of the peer-to-peer network. In addition, it may be necessary that this participant must have a reputation factor which increases a predefined minimum reputation factor.

As previously described, it may be possible that in return to the change of a function of an appliance device, the request entity has to fulfill at least one generated function transaction criterion prior to the change of function, during the change of function and/or after the change of function. According to one embodiment, the peer-to-peer application may be configured to cause the conduction of a function transaction criterion transaction based on at least one function transaction criterion of the stored function transaction agreement, preferably, stored in the peer-to-peer application. For instance, the function transaction criterion may be a financial value. Financial values can be (instantaneously) exchanged with a transaction via a cryptocurrency. In an alternative or additional embodiment micropayment channels may be used for a (constant) payment stream that can be handled e.g. partly off-chain to reduce the amount of on-chain transactions. In a further embodiment so called state channels or state networks (e.g. Raiden Network) may be used to exchange digital tokens off-chain in a secure way. Opening and/or closing of state channels may be registered on the peer-to-peer application. This means that individual transactions may not be stored on the peer-to-peer application in order to improve scalability and avoid movement tracking of pseudonyms on the peer-to-peer application. According to the present invention, a man-in-the-middle is not necessary. Fully automated processes from authentication to charging and billing can be provided.

According to a further preferred embodiment, the at least one peer-to-peer application can be a decentralized register or a shared database configured to store data, e.g. function transaction agreement(s), identifier(s) (e.g. signatures), function module(s), sensor data set(s), etc., with given certain proofs or signatures. In addition to e.g. identifiers, the decentral register can store computer code acting as e.g. controlling means for controlling the change of a function of one or more appliance devices. In particular, the code can be invoked by a transaction to the address of the code in so called 'smart contracts'. This code can be processed on the node(s) of the decentral register.

It shall be understood that (smart contract) code or processing logic may be stored and executed in so called 'crypto conditions' of the Interledger protocol (ILP). This means that not necessarily all code must be stored in a smart contract such as Ethereum smart contract.

In a further embodiment the (smart contract) code may be stored and executed on a decentral computation market (e.g. Ethereum Computation Market, Trubit, Golem, Cryplets Microsoft).

In a further embodiment the computer codes of a device may include algorithm(s) for de-central cognitive analytics or machine learning. Analytics and learning can be shared with other devices can be shared, aggregated and further analyzed via the peer-to-peer applications.

A decentralized register can be readable at least by a part of the participants of the peer-to-peer network. In particular, every computer node, appliance device and/or entity e.g. including at least one respective peer-to-peer module can comprise the peer-to-peer application. The decentralized register, at least the public part (i.e. may be without private contracts) may be read at least by each participant of the peer-to-peer network. In particular, all peer-to-peer modules and all other computers of the peer-to-peer network can preferably read all information in the peer-to-peer application formed as a register. Preference is also that all peer-to-peer modules and all other computers of the peer-to-peer network can send messages to or write messages to the peer-to-peer application. A message or transaction sent to a smart contract (e.g. controlling or registering means) may start the execution of a code of the smart contract while using data stored in the smart contract. For instance, sending a registering message to a registering means may start the execution of the code resulting in conducting the registration process, as described hereinbefore.

The peer-to-peer application might be built upon the following elements: peer-to-peer network comprising Consensus System/Protocol, Data Structure, Merkle Trees, Public Key Signatures and/or Byzantine Fault Tolerance. It may replicate data based on a consensus principle. It may be auditable and traceable.

In a simple way information can be made available to preferably all participants. This may allow to carry out a review of the information stored in the decentral register or the code executed in the decentral register. Particularly preferably, each computer in the peer-to-peer network can be configured to review new information, in particular, based on older information stored in the peer-to-peer application. In addition, the at least one controlling means may be monitored by at least a part of the nodes of the peer-to-peer network, preferably by all nodes. A manipulation of can thus be prevented, at least detected.

Moreover, preferably each computer can in each case comprise the complete data content, but include at least a portion of the data contents of the peer-to-peer application, in particular, of the decentral register. For example, it may be provided that after a positive verification of written information (e.g. a message sent to the peer-to-peer application) in the peer-to-peer application this information is saved by all computers, at least by a part of the computers. For instance, after the generation of an function transaction agreement and/or after a successful registration, the agreement and identifier, respectively, can be stored at least by a part, preferably all nodes of the peer-to-peer network. In other words, the agreement and the identifier list are stored by a part, preferably all nodes of the peer-to-peer network. The tamper resistance of the data stored in the peer-to-peer application can thereby be further improved. The change of a function of an appliance device, the communication between two or more appliance devices and/or the conduction of a function transaction criterion transaction can be securely controlled.

In order to store new information in a tamper-proof way, the peer-to-peer application can comprise encryption means and/or signature means and/or verification means, wherein at least one of the encryption means and/or signature means and/or verification means is configured to store data, such as an function transaction agreement (s), identifier(s), function module(s), etc. In particular, it can be provided that by the hash function a link is established with at least one previously stored information in the decentral register. Further data, such as request messages, registering messages, ordinary, contextual and/or transaction data of an entity, such as a network device, can be stored.

The peer-to-peer application may be formed by a Directed Acyclic Graph (DAG). A directed acyclic graph, such as IOTA or Tangle, means that blocks (or nodes of the graph) are coupled to each other via directed edges. Thereby, direct means that the (all) edges have (always) a same direction similar to time. In other words, it is not possible to step back. Eventually, acyclic means that loops do not exist.

In a particularly preferred embodiment of the present system, the peer-to-peer application can be a block chain or decentral ledger comprising at least two blocks coupled to each other (e.g. Ethereum Block chain with Smart Contracts). The block chain technology or "decentral ledger technology" is already used in the payment by means of a crypto currency, such as Bitcoin. It has been recognized that by a particular configuration of a block chain, at least the change of a function of an appliance device and the communication among appliance device can be checked without the need of a central server or home controller. E.g. a controlling means can be easily implemented as a smart contract in a block chain. A building automation system can be managed in an easy manner.

In addition, the block chain can be used to generate predefined action(s) caused by at least one peer-to-peer module and/or a controlling means in a tamper-proof manner. The block chain according to the present embodiment is particularly a decentralized, peer-to-peer-based register in which all data related to at least one access control process can be logged. A block chain is particularly suitable as a technical means to replace a central entity/server in a simple and secure manner.

In alternative embodiments of the peer-to-peer application, the block chain can be a permissionless or permissioned block chain. In a specific case the block chain can be public, consortium or private block chain.

In a further embodiment, the peer-to-peer application can be formed by multiple block chains which are connected via mechanisms such as side chains or smart contracts. A peer-to-peer node can run one or more different block chain client (s).

Data of the peer-to-peer application can be stored on the "decentral ledger technology" and/or the decentral ledger steers (encrypted) data storage accessible via the internet and preferably in de-central data storage arrangement, object store and database, respectively, such as Interplanetary File System (IPFS) or storj or in a distributed Blockchain database (e.g. BigChainDB). Access to encrypted data to third party entities is managed via the permission means formed as one or more smart contract(s) on the block chain.

In addition, data feeds can be provided by the peer-to-peer application (so called "smart oracles"). Data feeds can provide further data relating to an appliance device from at least one further source. For instance, further weather data can be provided by a meteorological provider. Data can be captured from trusted sources off-chain and stored on the block chain or stored via the block chain on a decentral data storage entity.

As already described, information among peer-nodes can be exchanged by a peer-to-peer messaging system. This means a peer node can send a message to another peer node to submit an information or to trigger an action. Messages can be clear text, signed, hashed, time-stamped and/or encrypted. This means that not all data exchanged among peer nodes must be stored on the block chain.

In a further embodiment, the at least one peer-to-peer network can be formed by a plurality of computer nodes and a peer-to-peer module, such as the peer-to-peer module of an appliance device, the peer-to-peer module of a request entity, etc. . . . A peer-to-peer module may be only configured to communicate with the plurality of computer nodes. In other words, the peer-to-peer module is not a computer node of the peer-to-peer network but only a participant. Such a peer-to-peer module does not comprise the peer-to-peer application but only provides an interface module, such as an application programming interface (API), and a decentral application for communication with the computer nodes of the peer-to-peer network or the peer-to-peer application, such as a block chain or a smart contract on the block chain. For instance, such a peer-to-peer module can either send clear text or encrypted information or generate a secure connection (e.g. tunnel) to a peer-to-peer gateway (or so called "remote node") in order to communicate with the peer-to-peer network. This allows reducing the required processing power of the peer-to-peer module.

In one implementation of the peer-to-peer network, there can be only one validating peer or full node, e.g. only one node can be configured to perform a validation process, e.g. conducting an access authorization evaluation, and one or more observing (or monitoring) nodes. An observing node can validate transactions to establish a trust level but does not validate all transactions which is done by the validating peer.

In an alternative embodiment, the peer-to-peer module is one of the computer nodes. In this case, the peer-to-peer module comprises at least a part of the peer-to-peer application. In particular, the peer-to-peer module can comprise preferably the total data content of the peer-to-peer application or can access the information stored in another node. For instance, the peer-to-peer module might be a so called "light node" or a decentral application (DAPP) connected to a remote node.

It is noted that in the present case, according to an embodiment, the peer-to-peer module comprises at least an API configured to communicate with the peer-to-peer application, such as the block chain. In addition to the API, the peer-to-peer module comprises a decentral application of software comprising local algorithms at least configured to create and transmit data, such as instructions information, sensor data sets, to the peer-to-peer application via the API. The decentral application so called "Dapp" is at least configured to process and transmit said data.

Preferably, as described hereinbefore, data and messages can be signed or encrypted or can be transmitted via a cryptographically secured tunnel or a secured internet connection to a peer-to-peer node running the peer-to-peer application, such as the block chain. In another particular embodiment, also the peer-to-peer application itself is implemented in the peer-to-peer module, i.e. the peer-to-peer module is a node of the peer-to-peer network comprising the decentral application, the API and the peer-to-peer application, such as the block chain or decentral ledger.

Data and transactions stored on the block chain do not provide "transactional privacy". Transactions between pseudonyms may be (often) stored in clear text on the block chain. In some cases data stored on the block chain are encrypted and the keys may be handled via the block chain. Transactions between pseudonyms are stored in clear text on the block chain. Privacy preserving, secure transactions or execution of computer code can be achieved with cryptographic tools such as zero knowledge (zk) proofs or zk Succinct Non-interactive Arguments (zk-SNARK). Transactions or algorithms are separated into two parts: a smart contract on the block chain and a private contract. A privacy preserving protocol ensures the privacy of data and the correctness of code execution (SNARK verification is done via the smart contract on chain). The private contract computation can be done by a set of nodes, off-chain computers or done in measured launch environment or a secure hardware enclave for attestation and sealing that cannot be manipulated by other software code running on the devices. In an alternative embodiment secure Multi-Party-Computing (sMPC) systems can be used for transactional privacy. Examples for privacy preserving protocols and computation are HAWK and MIT Enigma.

With zero knowledge proof (zk Proofs) the parties can see that the algorithm is executed correctly in a private contract, but the input data are not disclosed to the party. In addition selective privacy can be achieved by sharing keys to decrypt transactions for reporting and auditing purposes.

To securely deploy code and or data into a device a trusted execution environment such as Intel SGX or TPM or Direct Anonymous Attestation module can be integrated with a peer-to-peer module.

Similarly, in an alternative (not shown) embodiment a particularly large peer-to-peer network may be divided in two or more (physical or logical or dynamically virtual) clusters. In a corresponding peer-to-peer network, for example, a validation (of a subset of transactions) may only be carried out by the members of one cluster (a subset of nodes; e.g. sharding of a block chain to improve the scalability). In a further embodiment the peer-to-peer application can be formed using multiple block chains. These block chains are connected via frameworks such as sidechains or smart contracts.

A further aspect of the present invention is a method for operating a building automation system, in particular, a previously described building automation system, the method comprising:
- communicating by at least one peer-to-peer module assigned to at least one first appliance device with at least one peer-to-peer application of at least one peer-to-peer network,
- providing at least one second function module from at least one controlling means to the first appliance device via the peer-to-peer module assigned to the first appliance device,
- wherein the first appliance device (preferably at least one actor of the first appliance device and/or at least one sensor of the first appliance device) is operated in accordance with the second function module in order to provide at least one second function.

The method according to the present invention allows the change of a function of an appliance device by providing at least one second function module from at least one controlling means to the first appliance device via the peer-to-peer module. Changing a function of an appliance device includes the change of a first function to a second function or the extension to a second function.

A further aspect of the invention is an appliance device of a building automation system, in particular, a previously described building automation system. The appliance device comprises at least one peer-to-peer module configured to communicate with at least one peer-to-peer application of at least one peer-to-peer network. The peer-to-peer module is configured to receive at least one second function module from the peer-to-peer application. The application device comprises at least one rewritable storage unit configured to store the second function module such that the appliance device (in particular, at least one actor of the appliance device and/or one sensor of the appliance device) is operated in accordance with the second function module.

A still further aspect of the present invention is a peer-to-peer application of a peer-to-peer network. The peer-to-peer application comprises at least one controlling means configured to provide at least one second function module to at least one appliance device of a building automation system such that the appliance device (in particular, at least one actor of the appliance device and/or at least one sensor of the appliance device) is operated in accordance with the second function module.

The controlling means may be, in particular, formed as a smart contract of the peer-to-peer application, such as a block chain.

The features of the methods, systems, modules, peer-to-peer applications, appliance devices and computer programs can be freely combined with one another. In particular, features of the description and/or the dependent claims, even when the features of the dependent claims are completely or partially avoided, may be independently inventive in isolation or freely combinable with one another.

These and other aspects of the present patent application become apparent from and will be elucidated with reference to the following figures. The features of the present application and of its exemplary embodiments as presented above are understood to be disclosed also in all possible combinations with each other.

DETAILED DESCRIPTION

Figure 1:
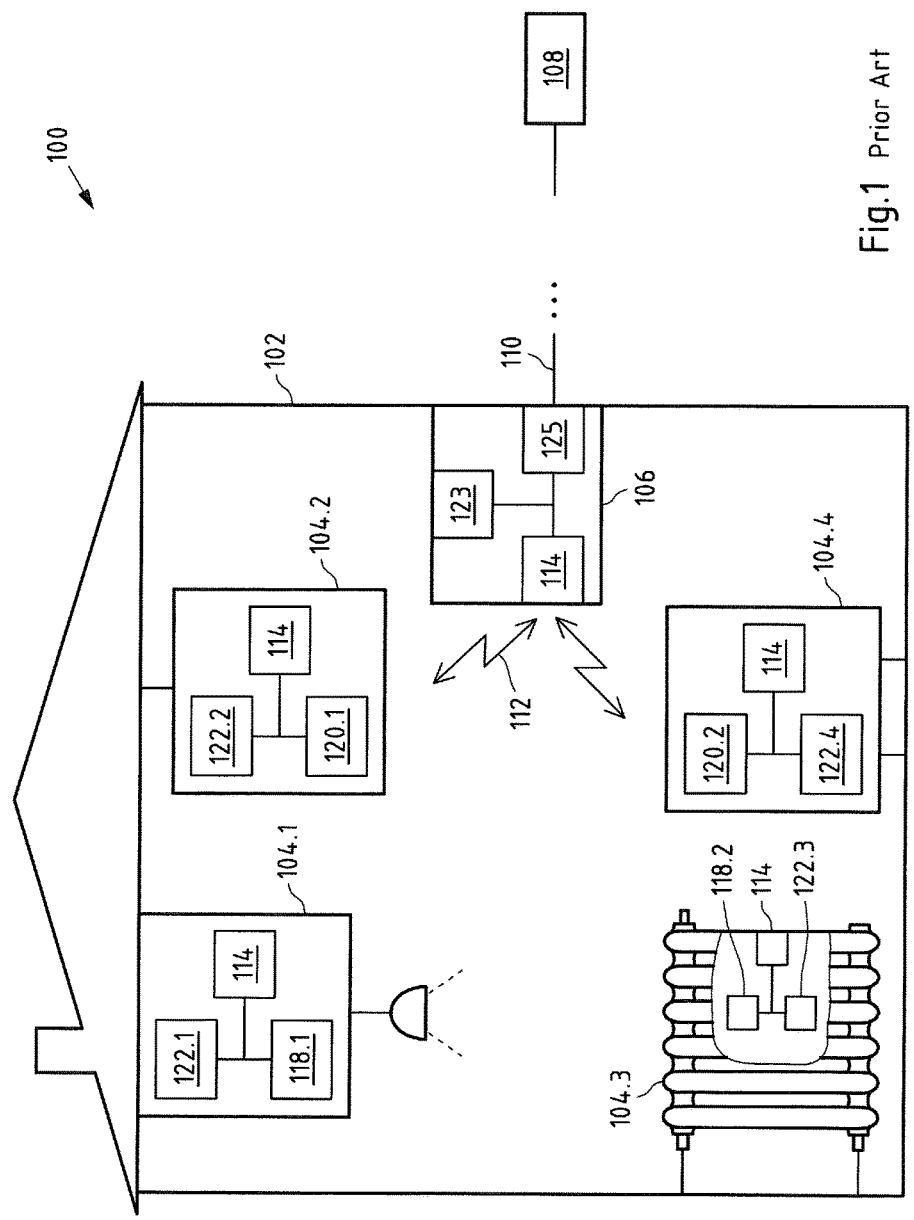
FIG. 1 shows schematic view of an embodiment of a building automation system according to prior art.

Like reference numerals in different figures indicate like elements.

Figure 2:
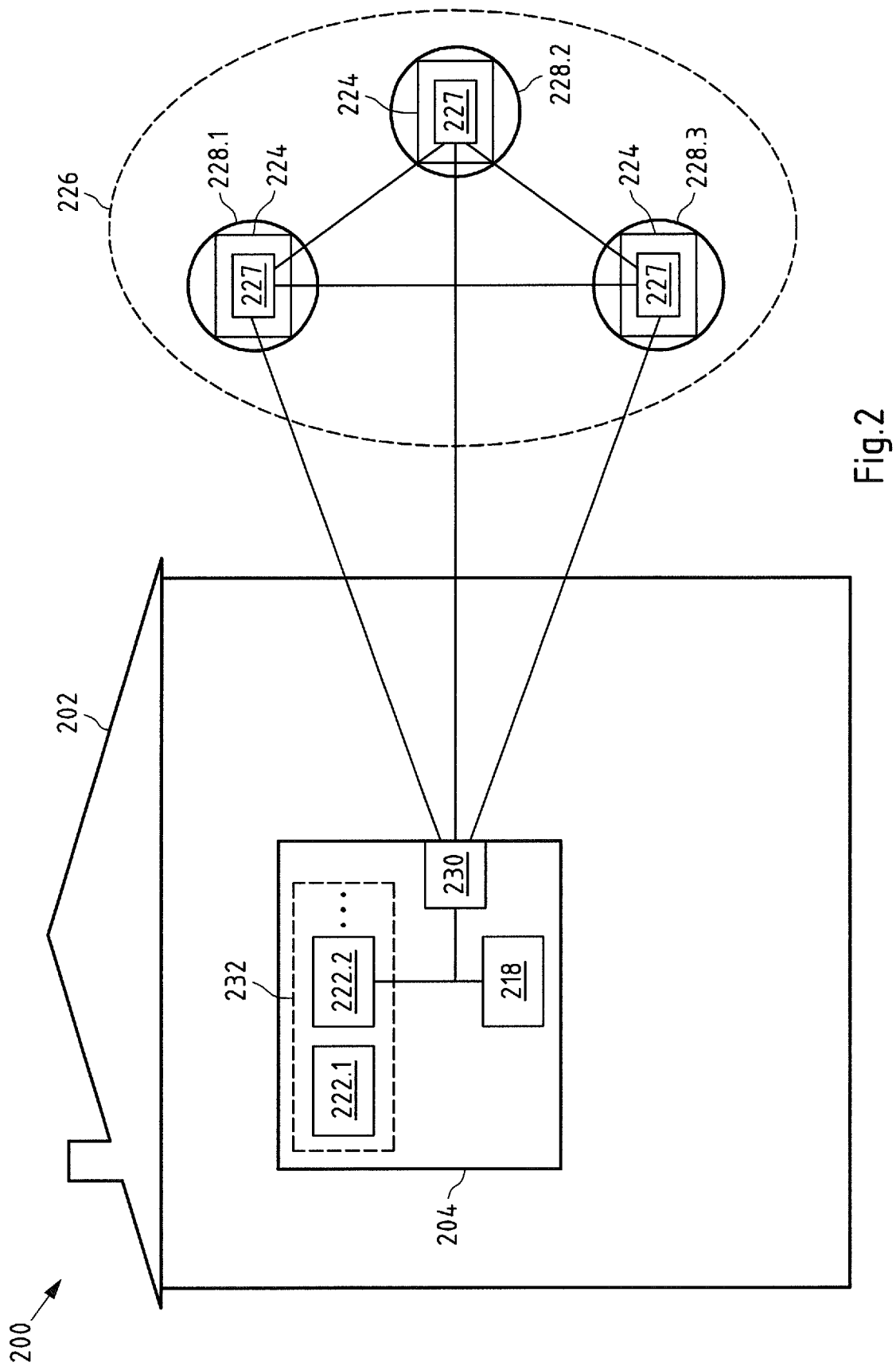
FIG. 2 shows a schematic view of a first embodiment of a building automation system according to the present invention.

FIG. 2 shows a schematic view of an embodiment of a building automation system 200 according to the present invention. The building automation system 200 comprises a building entity 202 in form of a building 202. In the present example, the building automation system 200 comprises only one appliance device 204. It shall be understood that a building automation system may comprise a plurality of appliance devices.

The depicted appliance device 204 comprises an actor 218. It shall be understood that an appliance device can comprise two or more actors and/or one or more sensors. In the present example, the actor 218 is connected with a rewritable storage unit 232. The storage unit 232 is configured such that function modules 222.1, 222.2 can be stored, changed and/or deleted after the manufacturing of the appliance device 204.

The rewritable storage unit 232 comprises a first function module 222.1 and a second function module 222.2. It shall be understood that an appliance device can comprise more than one second function module or only one second function module (no first function module). At least the actor can be operated in accordance with the provided function modules 222.1, 222.2.

A substantial difference compared with prior art building automation systems, such as building automation system 100 according to FIG. 1, is that no central instance (e.g. a backend or home controller or the like) and/or third party organization is provided. In the present case, the building automation system 200 comprises a peer-to-peer network 226 or a computer-to-computer network 226. The peer-to-peer network 226 comprises a plurality of nodes 228.1, 228.2, 228.3 and computers 228.1, 228.2, 228.3, respectively. A peer-to-peer network 226 is characterized in the present case in that each node 228.1, 228.2, 228.3 and/or participant 230 is preferably connectable at least to every other node 228.1, 228.2, 228.3 and/or participant 230. For instance, at least one physical standard network (wired and/or wireless) can be used for connection. For communicating via the at least one physical standard network suitable transceiver modules may be arranged in the respective entities/devices.

In addition, the computers 228.1, 228.2, 228.3 have equal rights, something which distinguishes them from a server-client structure.

The depicted nodes 228.1, 228.2, 228.3 (each) comprise a peer-to-peer application 224. As can be seen from FIG. 2, the same peer-to-peer application 224 is preferably implemented on each node 228.1, 228.2, 228.3. The peer-to-peer application 224 may preferably be a public register 224 that can, in particular, be inspected by all participants 228.1, 228.2, 228.3, 230 (not only the nodes 228.1, 228.2, 228.3) of the peer-to-peer network 226. Each node 228.1, 228.2, 228.3 preferably has the (entire) public register 224. It may also be envisaged that only part of the register can be provided on a node (light node). In a particularly preferred embodiment, the peer-to-peer application 224 may be a block chain 224 which will be explained in more details hereinafter. It shall be understood that the peer-to-peer network may comprise further nodes. In addition, it shall be understood that also an appliance device and/or an access entity can be formed as a node of the peer-to-peer network.

The peer-to-peer application 224 may be configured to manage and control a change of the function(s) provided by the appliance device 204. The peer-to-peer application 224 may comprise a controlling means 227. In particular, the provision of a (new) second function module 222.2 to an appliance device 204 is controlled by the controlling means 227 of the peer-to-peer application 224. In order to provide the second function module from the peer-to-peer application 224 to the appliance device 204, a peer-to-peer module 230 assigned to the appliance device 204 is provided.

A peer-to-peer module 230 is (generally) configured to communicate at least with the peer-to-peer network 226, i.e. the nodes 228.1, 228.2, 228.3 of the peer-to-peer network 226. In other words, the peer-to-peer module 230 or the appliance device 204 corresponding or assigned to the respective peer-to-peer module 230 is at least a participant of the peer-to-peer network 226. Preferably, all participants 228.1, 228.2, 228.3, 230 (including all nodes) of the peer-to-peer network 226 are known to each participant 228.1, 228.2, 228.3, 230 of the peer-to-peer network 226.

In the present case, the peer-to-peer module 230 is not a node of the peer-to-peer network 226 but only participants 230. While the nodes 228.1, 228.2, 228.3 or computers 228.1, 228.2, 228.3 in the peer-to-peer network 226 comprise at least a part of the peer-to-peer application 224, a participant 230 of a peer-to-peer network 226, like the present peer-to-peer module 230, does not comprise the peer-to-peer application 224. Such a peer-to-peer module 230 is configured to provide (only) access to the peer-to-peer application 224 e.g. via an API (application programming interface). Each peer-to-peer module 230 (also a node or light node) may comprise a decentral application and at least an API.

In the case, the peer-to-peer module is formed as a node of the peer-to-peer network the peer-to-peer module (also) comprises at least partly the peer-to-peer application 224. It shall be understood that a peer-to-peer module might be a node of the peer-to-peer network. It shall be understood that a peer-to-peer module may have access or may be connected to a gateway running a node of the peer-to-peer network.

The first peer-to-peer module 230 may comprise a communication connection to the storage unit 232. In particular, by means of the controlling means 227 of the peer-to-peer application 224, at least one second function module 222.2 can be provided to the appliance device 204 in order to implement a new second function. The controlling means 227 can provide a second function module 222.2 to the peer-to-peer module 230. By way of example, such a second function module 222.2 can be stored in the public peer-to-peer application 224. The at least one peer-to-peer module 230 of the appliance device 204 can inspect and read out, respectively, the second function module 222.2 e.g. intended for the implementation in the appliance device 204 using an identifier or the like.

Alternatively or additionally, one or more messages comprising the second function module 222.2 can be transmitted to the peer-to-peer module 230 of the appliance device 204. The controlling means 227 may be configured to cause storing and/or transmitting of the at least one second function module 222.2. The provided second function module 222.2 may be locally stored by the appliance device 204 in the storage unit 232.

Figure 3:
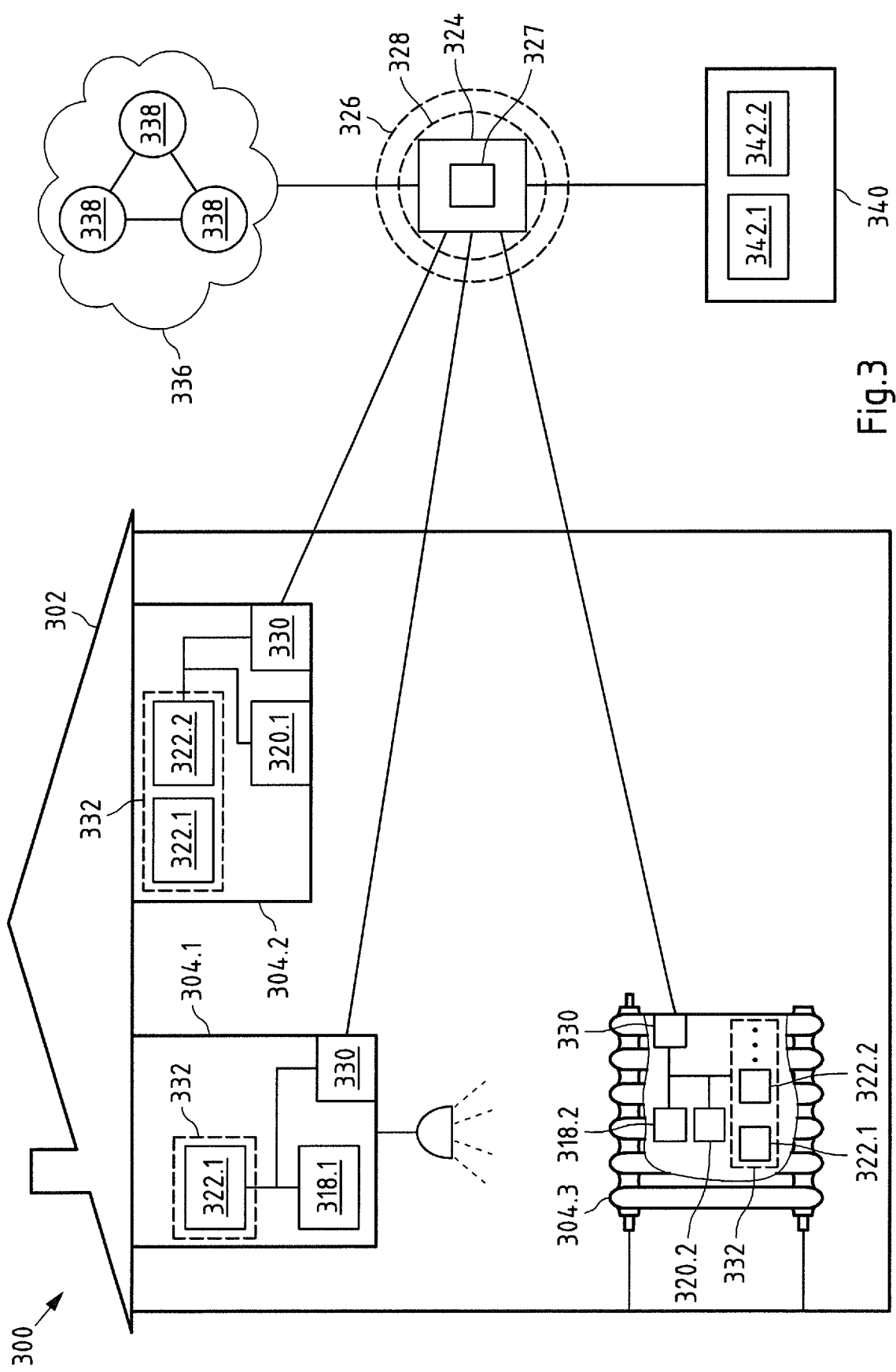
FIG. 3 shows a schematic view of a further embodiment of a building automation system according to the present invention.

FIG. 3 shows a further embodiment of a building automation system 300 according to the present invention. As can be seen from FIG. 3, a plurality of appliance devices 304.1, 304.2, 304.3 are arranged in a building entity 302. Furthermore, a peer-to-peer network 326 comprising a plurality of nodes 328 is provided. It is noted that merely for the sake of clarity of the present FIG. 3, merely one node 328 is depicted.

A first appliance device 304.1 may be a light appliance device 304.1 having an actor 318.1 for activating and deactivating the light. In other embodiments, the actor may be a dimmer configured to control the brightness of the light appliance device. At least the actor 318.1 may be operated depending on the implemented first function module 322.1 (e.g. a state machine or the like) and at least one received input parameter, such as at least one instruction parameter and/or at least one sensor parameter. In particular, the at least one received input parameter is processed by processing means of the appliance device 304.1 in accordance with the rule(s)/algorithm(s) of the first function module 322.1. Then, at least the actor is operated in accordance with the result of the processing.

A further appliance device 304.3 may be a heating appliance device 304.3 comprising an actor 318.2 (e.g. a valve or the like) for the heat dissipating and a temperature sensor 320.2. The heating appliance device 304.3 may comprise a first function module 322.1 and a second function module 322.2. For instance, a measured temperature value of the sensor temperature sensor 320.2 is processed in accordance with the first function module 322.1. Based on the result of the processing, the actor 318.2 is operated.

A further appliance device 304.2 may be a motion detector 304.2 comprising a motion sensor 320.1. The motion detector 304.2 comprises a first and a second function module 322.1, 322.2.

Originally, the following described functions were implemented in and provided by the appliance devices 304.1 to 304.3. The motion detector 304.2 may be originally configured (due to the originally implemented first function module 322.1) to detect a movement within a specific detection area in order to drive the light appliance device 304.1. If a movement is detected, the light appliance device 304.1 may be switched on by forwarding a respective input parameter to the light appliance device 304.1. As described above, the heating appliance device 304.3 may be originally configured (due to the first function module 322.1) to activate and deactivate (or increase and decrease) the temperature of the heating appliance device 304.3 depending on the temperature measured by the temperature sensor 320.2.

According to the present invention, the function(s) provided by the appliance devices 304.1 to 304.3 can be changed, in the present case extended, in a simple manner. By means of the controlling means 327 of the peer-to-peer application 324, at least one second function module 322.2 has (already) been provided to the motion detector 304.2 and one second function module 322.2 has (already) been provided to the heating appliance device 304.3.

For instance, a plurality of (different) second function modules 322.2 may be stored in a storage arrangement 336 controlled by the peer-to-peer application 324. As described above, data can be stored in the peer-to-peer application 324 and/or in a storage arrangement 336 controlled by the peer-to-peer application 324. Preferably, the storage arrangement 336 comprising a plurality of decentral storage units 338 may be formed as a decentral file system (such as IPFS) or a decentral object store (such as storj) or a decentral distributed database (such as BigchainDB) controlled by the peer-to-peer application 324. By way of example, the controlling means 327 can access the storage arrangement 336 to provide one or more specific second function modules 322.2 to one or more appliance devices 304.1 to 304.3.

Furthermore, an off chain processing arrangement 340 or off-chain computing entity controlled by the peer-to-peer application 324 is provided. For instance, evaluating means 342.1 configured to evaluate data, e.g. sensor data, status data, or the like, of one or more appliance device(s) may be provided in order to improve e.g. the performance of one or more individual appliance device(s) and/or the performance of a (sub-)building automation system 300.

Furthermore, generating means 342.2 configured to generate (new) second function module(s) to be provided to one or more appliance device(s) may be provided. E.g. based on specification(s) desired by a user of a (sub-)building automation system 300 and technical specification(s) of the (registered) appliance device(s) (whose function should be changed) at least one second function module may be generated (for said appliance device(s)).

The technical specifications of the registered appliance device(s) may be stored in the peer-to-peer application 324 or the storage arrangement 336. After the generation of a second function module, the generated second function module can be transmitted to the at least one appliance device and/or the generated second function module can be stored in the peer-to-peer application 324 or the storage arrangement 336.

By way of example, following function change has been conducted in the present building automation system 300. It may be desired that the heating appliance device 304.3 is (additionally) controlled depending on the motion detector 304.2, in particular, motion parameter(s) measured by the sensor 320.1 of the motion detector 304.2. For instance, the temperature of the heat appliance device 304.3—by means of the actor 318.2—should depend on the presence of a user in the vicinity of the heat appliance device 304.3.

The second function module 322.1 of the motion detector 304.2 may define that a movement detected by the sensor 320.1 has to be transmitted by the peer-to-peer module 330 of the motion detector 304.2 to the peer-to-peer module 330 of the heating appliance device 304.3 (directly or via the peer-to-peer application 324).

The second function module 322.2 of the heating appliance device 304.3 may define the processing of such a received information e.g. by providing an algorithm or rule(s). For instance, if a movement is detected the temperature is set of a first set point. Otherwise, the temperature may be set to another (smaller) set point. Similar, the non-detection of a movement (for a particular time period) may result in a reduction of the desired set point from a first set point to a further set point. It shall be understood that other rule(s) may be defined.

It shall be further understood that further function changes are possible as long as the hardware specification of the appliance devices are such that the respective functions can be implemented.

It is noted that in the present case each appliance device 304.1 to 304.3 comprises a peer-to-peer module 330 and a storage unit 332 for storing one or more function modules 322.1, 322.2.

Figure 4:
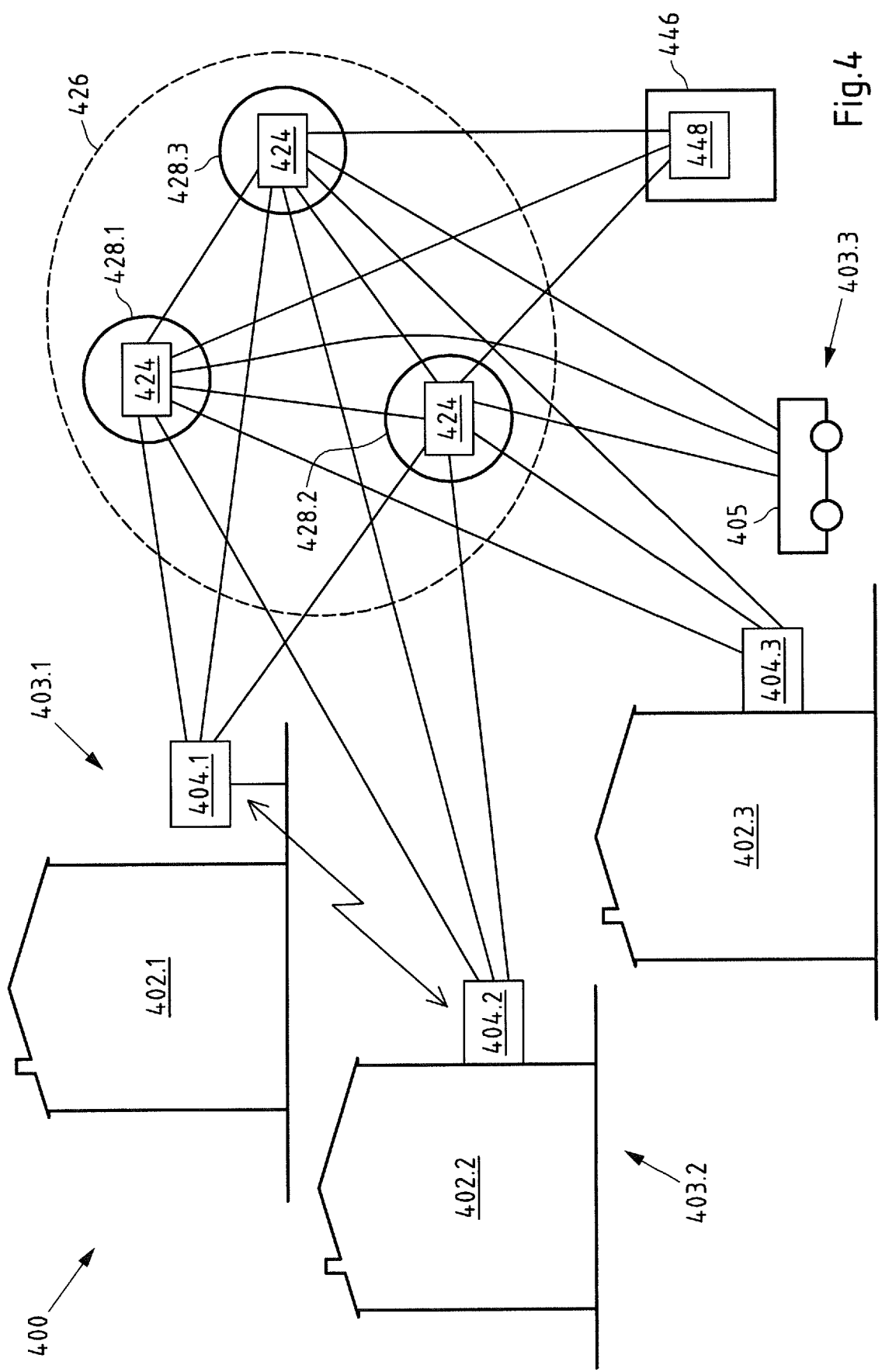
FIG. 4 shows a schematic view of a further embodiment of a building automation system according to the present invention.

FIG. 4 shows a further embodiment of a building automation system 400 of the present invention. As can be seen from FIG. 4, an exemplified peer-to-peer network 426 comprising a plurality of nodes 428.1, 428.2, 428.3 is provided. Each node 428.1, 428.2, 428.3 comprises a peer-to-peer application 424 with a (not shown) controlling means.

Furthermore, a plurality of sub-building automation systems 403.1, 403.2, 403.3 are provided. In the depicted embodiment, each sub-building automation system 403.1, 403.2, 403.3 relates to a separate building entity 402.1, 402.2, 402.3. Each sub-building automation system 403.1, 403.2, 403.3 comprises a single appliance device 404.1, 404.2, 404.3. It is noted that a sub-building automation system may comprise a plurality of (different) appliance devices. Merely for the sake of clarity, only three appliance devices are depicted without details (e.g. sensor(s), actor(s), storage unit(s), peer-to-peer module(s)).

As can be seen from FIG. 4, a first appliance device 404.1 of a first sub-building automation system 403.1 can communicate with a further appliance device 404.2 of a further sub-building automation system 403.2 without using a server, home controller or similar central instance. For instance, the appliance devices 404.1, 404.2 can directly communicate with each other (using a peer-to-peer messaging tool) or via the peer-to-peer application 424.

Thereby, in order to provide a high security, each exchanged message can be provided by a signature of the sending appliance device and/or sending peer-to-peer module. The signature of a received message can be checked by at least part of the nodes 428.1, 428.2, 428.3 of the peer-to-peer network 426. For instance, it can be checked whether said signature correspond to a valid signature stored in a list in the peer-to-peer application 424 or a storage arrangement controlled by the peer-to-peer application.

Furthermore, the building automation system 400 comprises at least one request entity 446 with a peer-to-peer module 448. The request entity 446 may be formed as a computing device (e.g. mobile phone, tablet computer, computer, etc.). The request entity 446 may be configured to transmit a request message to the peer-to-peer network 426 in order to install a (new) second function into at least one appliance device e.g. for obtaining desired information from one or more appliance device(s).

By way of example, a photovoltaic distributor is looking for information of cloud movement in a specific area. Via a (registered) request entity 446 the photovoltaic distributor may send a request message to the peer-to-peer network 426. For instance, it can be requested that on a plurality of motion detectors 404.1 to 404.3 a specific second function module should be implemented which enables obtaining of shadowing information through said motion detectors 404.1 to 404.3 and transmitting the obtained information to the request entity 446.

In addition, it may be requested that previously described evaluating means are used to evaluate the shadowing information of said plurality of motion detectors 404.1 to 404.3 and to provide (only) the evaluation results to the request entity 446.

According to other variants, the request entity may also be an appliance device. For instance, in order to enable a communication between two appliance devices, e.g. appliance devices 404.1 and 404.2, at least one of the involved appliance devices 404.1 and 404.2 can transmit a request message in order to generate a communication transaction agreement about the communication between the involved appliance devices 404.1 and 404.2.

The generation of transaction agreements will be described in more details hereinafter.

Optionally, the depicted system 400 comprises further appliance device 405 in form of a mobile unit 405. For instance, the mobile unit 405 may be an autonomous vehicle 405. The mobile 405 unit can be at least temporarily assigned to the building entity 402.3. The mobile unit 405 may comprises a peer-to-peer module and a first function module and/or a second function module.

Figure 5:
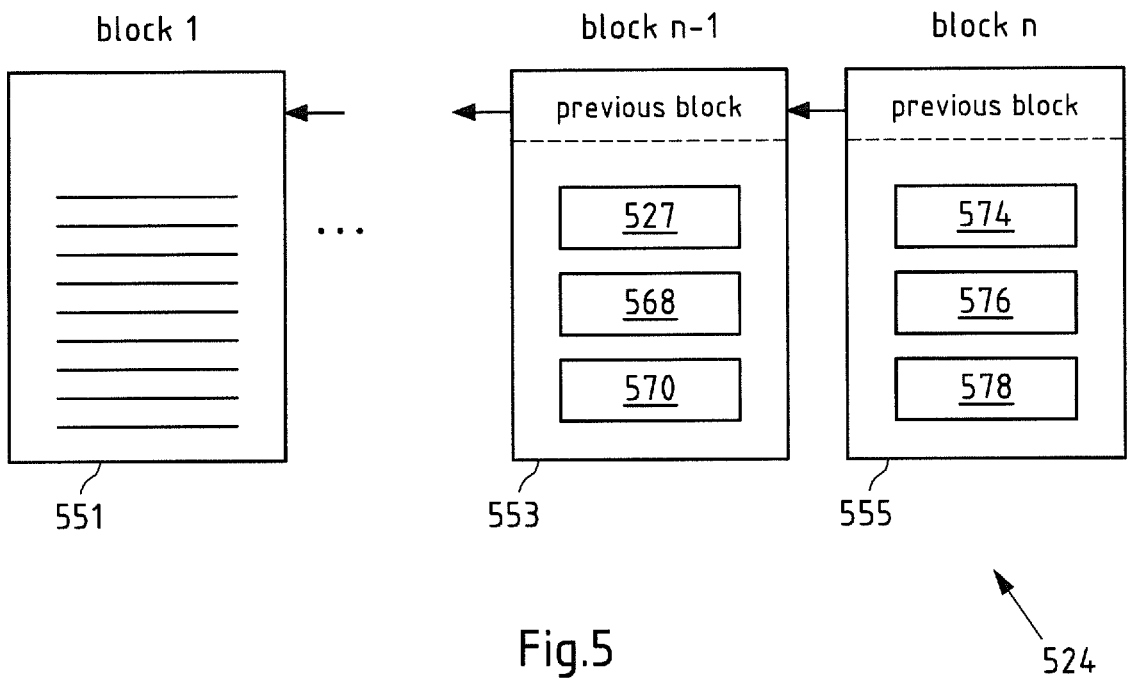
FIG. 5 shows a schematic view of an embodiment of a peer-to-peer application according to the present invention.

FIG. 5 shows an embodiment of a peer-to-peer application 524 according to the present invention.

The depicted peer-to-peer application 524 is a register readable, in particular, by the participants of the peer-to-peer network. Thereby, data set(s) or information e.g. in form of messages can be written and/or read into/from the register 524 by a peer-to-peer module of an appliance device, a request entity and/or any other participants in the peer-to-peer network. In a preferred embodiment, the peer-to-peer application 524 may be a block chain 524.

Hereinafter, it is assumed in the following description of the present embodiment that the at least one peer-to-peer application 524 is a block chain 524. However, the following remarks can be easily transferred to other peer-to-peer applications, such as a Directed Acyclic Graph (DAG). A directed acyclic graph, such as IOTA or Tangle, means that blocks (or nodes of the graph) are coupled to each other via directed edges. Thereby, direct means that the (all) edges have (always) a same direction similar to time. In other words, it is not possible to step back. Eventually, acyclic means that loops do not exist.

In further embodiments of the peer-to-peer application the block chain can be a permissionless or permissioned block chain. In a specific case the block chain can be public, consortium or private block chain.

In a further embodiment, the peer-to-peer application can be formed with multiple block chains which are connected via mechanisms such as side chains or smart contracts. Interoperability among block chains can be established.

The block chain 524 is formed by at least one block 551, 553, 555, preferably by a plurality of interconnected blocks 551, 553, 555. The first block 551 may also be called genesis block 551. As can be seen, a block 553, 555 (except for the first block 551) refers to each previous block 551, 553. A new block can be created by a computationally intensive process (for example, so called "mining" or through another appropriate process, such as voting) and will be particularly provided to all participants of the peer-to-peer network.

The present block chain 524 is particularly adapted to receive messages, such as messages comprising instruction information and/or instructions data set(s), function module (s), measured sensor data set(s), evaluation result(s), etc., e.g. from a peer-to-peer module of a previously described appliance device, request entity, off-chain computing entity or from another peer-to-peer device/unit of another participant of the peer-to-peer network. Further, the block chain 524 is particularly adapted to save these messages in the block chain 524. Furthermore, the block chain 524 is configured to generate messages e.g. based on a request message, instruction message, event, validation process, an evaluation result and/or caused by a peer-to-peer module and/or the execution of code of e.g. a controlling means 527. In particular, the block chain 524 is at least configured to control and manage a building automation system, such as shown in FIGS. 2, 3 and/or 4.

In particular, a (newly) received message can be saved and published in the current block 555 of the block chain 524. Due to the configuration of a block chain 524 as a public register 524, said data message of e.g. a peer-to-peer module can be read by preferably all participants of the peer-to-peer network. Alternatively or additionally, data of a message may be stored on a decentral file service or distributed block chain database controlled by the block chain 524.

As already described, in the present block chain 524 different types of messages and data sets, respectively, for example, within a smart contract (algorithm and/or storage at the block chain 524) can be processed and/or stored. In the present example, the block chain 524 comprises a controlling means 527 in form of a smart contract 527. As previously described the controlling means 527 may be configured to control a function change of at least one appliance device by controlling the provision of at least one second function module to the at least one appliance device.

Furthermore, in the block chain 524 one or more function transaction agreement(s) 568 may be stored. A function transaction agreement 568 may be generated on an initiation of at least one entity, such as a user and/or appliance device and/or request entity which desires the implementation of at least one second function module on at least one appliance device in order to provide at least one second function through said appliance device.

An example of a generation of such a function transaction agreement 568 will be described in the following:

A function transaction agreement 568 may comprise at least one of the following data:

Identifier(s): One or more identifier(s) of the involved entities, such as an identifier of the request entity, and one or more identifier(s) of the one or more appliance device(s) on which a function module should be installed, identifier of the provider entity, etc.

Function transaction criterion: Criterion that must be fulfilled by e.g. a request entity for the provision of a second function module to an appliance device and/or for the operation of the appliance device in accordance with said second function module Second function module: Second function module to be provided to an appliance device (e.g. an identifier and/or storage address of the second function module)

The function transaction criterion may be e.g. an amount of cryptocurrency e.g. per time unit or per data amount unit which has to be transferred prior to, during and/or after the provision of the at least one second function module to at least one appliance device (and/or the operation of the at least one appliance device in accordance with said function module). Preferably, at least a part of the agreed amount of cryptocurrency can be locked by the peer-to-peer application 524 prior to the provision action. In an embodiment the function transaction criterion may be a payment channel for streaming small amounts of crypto tokens per each time and/or data unit. It shall be understood that other transaction criteria and further information can be included in an function transaction agreement. More information/criteria can be, for example, a time stamp, an ID of the transaction and the like.

In order to generate a function transaction agreement 568, a peer-to-peer module of a request entity (e.g. an appliance device or other computing device) and the peer-to-peer application of a further peer-to-peer module of a provider entity (e.g. an appliance device or other computing device of e.g. the provider/user of a (sub) building automation system) can exchange request and response (acceptance) messages via the peer-to-peer application 524. A (function) request message 570 may comprise indications about the above data (identifications, transaction criteria, desired function(s)).

For instance, an appliance device whose function should be changed can send by its peer-to-peer module an acceptance message 574 to the peer-to-peer application 524 comprising data, such as an identifier assigned to the appliance device and/or at least one function transaction criterion and/or the like. For instance, the acceptance message 574 may comprise identical or at least similar data details as compared with a request message 572. Additionally, the acceptance message 574 can comprise a reference indication to a previous message, such as the ID of the request message 572. The acceptance message 574 can be provided by the peer-to-peer module of an appliance device.

If, for example, the acceptance message 574 comprises a higher or other transaction criterion and/or another desired function(s), the acceptance message 574 can be called a counter-offer message. This can be accepted by the peer-topeer module of the request entity through a further acceptance message. Based on this a peer-to-peer module of a request entity and/or provider entity and/or appliance device may cause the generation of a function transaction agreement 568 about the provision of at least one second function module to the at least one appliance and the subsequent operation of the appliance device in accordance with said function module.

In particular, there can be multiple (function) request messages and/or accepting messages and/or messages comprising a requested appliance device/second function module for different transaction criterions. Each entity can give guidelines, according to which at least one function transaction agreement 568 or other agreements can be generated. In a preferably automated, such as iterative process, each request/offer message can be associated to an optimally corresponding acceptance message. The block chain 524 may be configured to generate, based on the messages of a peer-to-peer module, a function transaction agreement 568.

Further, the controlling means 527 may be configured to control the provision of the at least one second function module to an appliance device based on the one or more function transaction agreement(s) 568. The controlling means 527 may be executed by at least part of the nodes of the peer-to-peer network for conducting the provision of said function module. Thereby, the controlling means 527 can be a part of the function transaction agreement(s) 568. For instance, based on a stored function module or stored identifier of a stored function module, the peer-to-peer application 524, in particular, the access controlling means 527 may provide of second function module to the at least one appliance device (defined in the function transaction agreement(s) 568).

In a similar way, communication transaction agreement(s) between at least two appliance devices can be generated. Technical details about e.g. the communication protocol to be used, kind of data to be transmitted, identifiers of the involved appliance devices including communication addresses, signatures of the involved appliance devices and/or the like can be stored in a communication transaction agreement. Then, the peer-to-peer network can control the communication between said appliance devices by a part of its node based on the stored communication transaction agreement.

Also an update transaction agreement can be generated and stored in the peer-to-peer application comprising information about the conduction of update process(es) of at least one appliance device.

Moreover, a block chain 524 may comprise a registering means 576 configured to register a (new) appliance device and/or request entity in the block chain 524 as a smart asset. Also a new evaluating means and/or storage arrangement or the like can be registered.

After a positive registration process, the respective entity can be registered within the block chain 524 e.g. by storing its unique identifier in an identifier list 578. Further details can be stored in the list, such as signatures, keys, technical specifications of the entity, permissions, etc.

Figure 6:
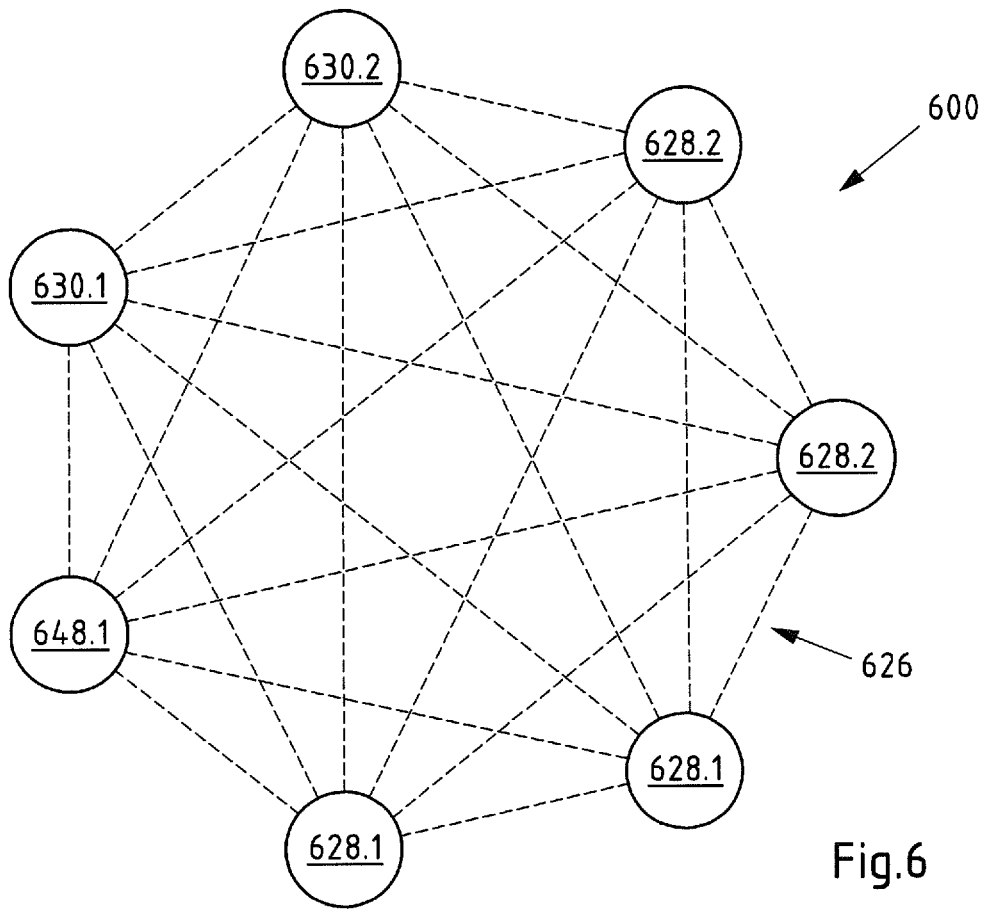
FIG. 6 shows a schematic view of a further embodiment of a building automation system according to the present invention.

FIG. 6 shows a schematic view of another embodiment of a building automation system 600 of the invention. In the present embodiment only nodes and participants 628.1, 628.2, 630.1, 630.2, 648.1 of the peer-to-peer network 626 are shown. In the present example, it is assumed that all nodes 628.1, 628.2, 630.1, 630.2, 648.1 comprise the peer-to-peer application (not shown).

The nodes 630.1, 630.2 may correspond to appliance devices and e.g. be formed by the respective peer-to-peer modules of the appliance devices. The node 648.1 may be a request entity realized by a peer-to-peer module of the request entity. Nodes 628.1 and 628.2 may be other nodes which are not an appliance device and/or request entity. It shall be understood that nodes can be full, remote or light nodes.

As can be seen, two different types of peers or node computers 628.1, 630.1, 648.1 and 628.2, 630.2 are presently illustrated. All peers 628.1, 628.2, 630.1, 630.2, 648.1 are comprised by the peer-to-peer network 626. In the present embodiment, however, only a part of the peers 628.1, 628.2, 630.1, 630.2, 648.1 in the present case, the peers (nodes) 628.1, 630.1, 648.1, check the validity of e.g. a signature of a received message, an evaluation process, an provision process of a second function module and/or further data stored in the peer-to-peer application, such as agreements, instructions data set messages, and the like.

Furthermore, only a part of the entire peers can be configured to store the peer-to-peer application and/or only a part of the peers can be configured to execute the algorithms of a smart/private contract and/or only a part of the peers can be configured to store (log) data. Since the validation/verification of e.g. identification data requires a considerable computational effort, it may be advantageous for reasons of efficiency, if only a part of the peers 628.1, 630.1, 648.1, especially particularly powerful peers 628.1, 630.1, 648.1 perform the validation and/or controlling algorithms.

It shall be understood that further de-central or central systems (not shown here) can be integrated with the peer-to-peer network 626. Examples: ERP, MES, Facility Management, Planning or Documentation systems, control rooms, configuration terminals. These systems shall be understood as further appliances devices e.g. connected to the peer-to-peer application via a peer-to-peer module.

Validation, analytics and optimization can be done on-chain or off-chain, as described hereinbefore. Off-chain validation and/or optimization can be managed by the peer-to-peer application, like the code on the block chain. Powerful means in particular a high computing power. In other words, in the present case a valid entry in the peer-to-peer application, such as a block chain, is assumed if (only) a part of the peers 628.1, 630.1, 648.1 comes to a positive result. It shall be understood that only a single, especially particularly powerful peer can perform the validation, analytics and/or optimization process.

Similarly, in an alternative (not shown) embodiment, a particularly large peer-to-peer network may be divided in two or more clusters. In a corresponding peer-to-peer network, for example, a validation will only be carried out by the members of one cluster (e.g. sharding of a block chain to improve the scalability). In a further embodiment the peer-to-peer application can be formed using multiple block chains. These block chains are connected via frameworks such as sidechains or smart contracts or interledger.

Figure 7:
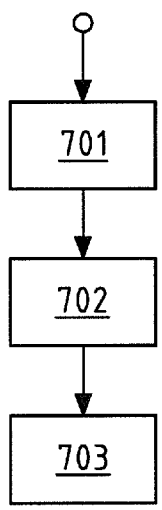
FIG. 7 shows a diagram of an embodiment of a method according to the present invention.

FIG. 7 shows an embodiment of a method according to the present invention. The method is configured to operate a building automation system, such as a previously described building automation system.

In a first step 701, one or more appliance devices, at least one sensor and/or at least one actor of at least one appliance device, may be operated in accordance with at least one (preinstalled) first function module for providing a first function. In a further step 702, the function of said at least one appliance device can be changed by substituting the first function by a second function, amending the first function by a second function or extending the function from one function to two functions (first and at least one second function). More particularly, at least one second function module can be received by an appliance device via its peer-to-peer module. The second function module is, in particular, provided by means of a controlling means of a peer-to-peer application, as previously described. Then, in step 703, the appliance device, in particular, at least one sensor and/or at least one actor, is (also) operated in accordance with said second function module. In particular, the second function module can be implemented in the appliance device such that it can be operated in accordance with said second function module.

Figure 8:
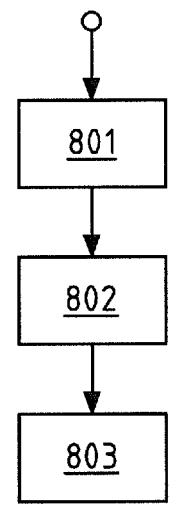
FIG. 8 shows a diagram of a further embodiment of a method according to the present invention.

FIG. 8 shows a further embodiment of a method according to the present invention. The method is configured to operate a building automation system, such as a previously described building automation system.

In a first step 801, a function transaction agreement can be generated by a peer-to-peer application, as previously described. Then, a controlling means of the peer-to-peer application may provide the at least one second function module to the at least one appliance device in accordance with the stored function transaction agreement (step 802). In particular, the second function module can be provided in such a way that in step 803 the appliance device can be operated in accordance with said second function module.

All references, including publications, patent applications, and patents cited herein are hereby incorporated by reference to the same extent as if each reference were individually and specifically indicated to be incorporated by reference and were set forth in its entirety herein.

The use of the terms "a" and "an" and "the" and similar referents in the context of describing the invention (especially in the context of the following claims) is to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

The invention claimed is:

1. A building automation system, comprising:
at least one first appliance device comprising at least one actor and/or at least one sensor,
wherein the first appliance device comprises at least one first function module,
wherein the first appliance device is configured to operate in accordance with the first function module in order to provide at least one first function,
at least one peer-to-peer network comprising at least one peer-to-peer application,
at least one peer-to-peer module assigned to the first appliance device and configured to communicate with the peer-to-peer application,
wherein the peer-to-peer application comprises at least one controlling means configured to provide at least one second function module to the first appliance device by means of the peer-to-peer module assigned to the first appliance device, and
wherein first appliance device is configured to operate in accordance with the second function module in order to provide at least one second function,
wherein the peer-to-peer application is configured to generate a function transaction agreement at least about provision of the second function module to the first appliance device;
wherein the at least one peer-to-peer network comprising the at least one peer-to-peer application is decentralized register;
wherein the second function is different from the first function; and
wherein the decentralized register is configured to generate the function transaction agreement based, in part, on messages of the peer-to-peer module.

2. The building automation system according to claim 1, wherein the first appliance device comprises a rewritable storage unit configured to store at least one of the first function module and the second function module.

3. The building automation system according to claim 1, wherein
the first function module is a first state machine,
the second function module is a second state machine, and
wherein the first state machine differs from the second state machine.

4. The building automation system according to claim 1, wherein
the building automation system comprises at least one further appliance device,
wherein the first appliance device is configured to directly communicate with the further appliance device, and/or
wherein the first appliance device is configured to communicate with the further appliance device by means of the peer-to-peer application.

5. The building automation system according to claim 4, wherein
the first appliance device is configured to communicate with the further appliance device by transmitting at least one message to the further appliance device, wherein the message is provided with a signature of the peer-to-peer module assigned to the first appliance device, and/or
the first appliance device is configured to communicate with the further appliance device by receiving at least one message from the further appliance device, wherein the message is provided with a signature of the peer-to-peer module assigned to the further appliance device.

6. The building automation system according claim 5, wherein at least one node of the peer-to-peer network is configured to validate at least one received message based on the provided signature prior to further processing the message.

7. The building automation system according to claim 4, wherein
the first appliance device is assigned to a first sub-building automation system assigned to a first building entity, and
the further appliance device is assigned to a further sub-building automation system assigned to a further building entity.

8. The building automation system according to claim 1, wherein
the building automation system comprises at least one request entity,
the building automation system comprises at least one peer-to-peer module assigned to the request entity, and
wherein the peer-to-peer module assigned to the request entity is configured to transmit a function request message to the peer-to-peer application.

9. The building automation system according to claim 1, wherein the controlling means is configured to provide at least one second function module to the first appliance device in accordance with the function transaction agreement.

10. The building automation system according to claim 1, wherein
the peer-to-peer application comprises at least one registration means configured to receive a registering message of a peer-to-peer module assigned to the first appliance device and/or to receive a registering message of a peer-to-peer module assigned to the request entity,
wherein the registration means is configured to register the first appliance device by storing a unique identifier of the first appliance device and/or to register the request entity by storing a unique identifier of the request entity.

11. The building automation system according to claim 1, wherein the peer-to-peer application is configured to cause the generation of a function criterion transaction based on at least one function criterion of a stored function transaction agreement.

12. The building automation system according to claim 1, wherein
the peer-to-peer application is inspectable by the participants of the peer-to-peer network.

13. The building automation system according to claim 12, wherein the peer-to-peer application is configured to store data with given certain proofs or signatures.

14. The building automation system according to claim 1, wherein the decentralized register is a block chain or decentral ledger comprising at least two blocks coupled to each other.

15. The building automation system according to claim 1, wherein a plurality of validating nodes of the peer-to-peer network is configured to validate at least one received message based on a provided signature prior to further processing the message,
wherein only in the case the plurality of validating nodes comes to a positive validation result, the message is further processed by the recipient.

16. A method for operating a building automation system, the method comprising:
communicating by at least one peer-to-peer module assigned to at least one first appliance device with at least one peer-to-peer application of at least one peer-to-peer network,
providing at least one second function module by at least one controlling means to the first appliance device via the peer-to-peer module assigned to the first appliance device, and
wherein the first appliance device is operated in accordance with the second function module in order to provide at least one second function,
the peer-to-peer application generates a function transaction agreement at least about provision of the second function module to the first appliance device;
wherein the peer-to-peer network comprising the at least one peer-to-peer application is a decentralized register;
wherein the at least one second function is different from a previous function of the first application device; and
wherein the decentralized register is configured to generate the function transaction agreement based, in part, on messages of the peer-to-peer module.

17. An appliance device of a building automation system, the appliance device comprising:
at least one peer-to-peer module configured to communicate with at least one peer-to-peer application of at least one peer-to-peer network,
wherein the peer-to-peer module is configured to receive at least one second function module from the peer-to-peer application, and
at least one rewritable storage unit configured to store the second function module such that the appliance device is operated in accordance with the second function module,
wherein the peer-to-peer application is configured to generate a function transaction agreement at least about provision of the second function module to the first appliance device;
wherein the peer-to-peer network comprising the at least one peer-to-peer application is decentralized register;
wherein the at least one second function is different from a previous function of the first appliance device; and
wherein the decentralized register is configured to generate the function transaction agreement based, in part, on messages of the peer-to-peer module.

18. A peer-to-peer application of a peer-to-peer network, comprising:
at least one controlling means configured to provide at least one second function module to at least one appliance device of a building automation system such that the appliance device is operated in accordance with the second function module, wherein the appliance device comprises a peer-to-peer module configured to communicate with the peer-to-peer application;
the peer-to-peer application is configured to generate a function transaction agreement at least about provision of the second function module to the first appliance device;
wherein the peer-to-peer application of the peer-to-peer network is a decentralized register;
wherein the at least one second function is different from a previous function of the appliance device; and
wherein the decentralized register is configured to generate the function transaction agreement based, in part, on messages of the peer-to-peer module.

* * * * *

UNITED STATES PATENT AND TRADEMARK OFFICE
CERTIFICATE OF CORRECTION

PATENT NO. : 11,201,756 B2
APPLICATION NO. : 16/271548
DATED : December 14, 2021
INVENTOR(S) : Jens Reinelt et al.

It is certified that error appears in the above-identified patent and that said Letters Patent is hereby corrected as shown below:

In the Claims

Column 28, Claim 1, Line 27, reads "the at least one peer-to-peer application is decentralized" and should read --the at least one peer-to-peer application is a decentralized--

Column 30, Claim 17, Line 18, reads "one peer-to-peer application is decentralized register;" and should read --one peer-to-peer application is a decentralized register;--

Signed and Sealed this
Nineteenth Day of April, 2022

Katherine Kelly Vidal
*Director of the United States Patent and Trademark Office*